United States Patent
Govindassamy et al.

(10) Patent No.: US 10,004,066 B1
(45) Date of Patent: Jun. 19, 2018

(54) METHOD AND APPARATUS FOR EFFICIENT USAGE OF TRANSMISSION RESOURCES IN WIRELESS COMMUNICATION SYSTEMS

(71) Applicant: MBIT WIRELESS, INC., Irvine, CA (US)

(72) Inventors: Sivakumar Govindassamy, Irvine, CA (US); Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 91 days.

(21) Appl. No.: 15/054,278

(22) Filed: Feb. 26, 2016

(51) Int. Cl.
*H04W 72/04* (2009.01)
*H04W 28/06* (2009.01)

(52) U.S. Cl.
CPC ....... *H04W 72/044* (2013.01); *H04W 28/065* (2013.01)

(58) Field of Classification Search
CPC . H04L 45/00; H04L 49/3072; H04L 49/3018; H04L 45/24; H04L 49/90; H04W 28/00; H04W 72/04; H04W 72/0446; H04W 47/40; H04W 47/22
See application file for complete search history.

(56) References Cited

U.S. PATENT DOCUMENTS

| | | | | |
|---|---|---|---|---|
| 7,653,072 B2* | 1/2010 | Deforche | ............... | H04L 47/34 365/230.03 |
| 7,685,254 B2* | 3/2010 | Pandya | ............. | G06F 17/30985 370/389 |
| 7,860,120 B1* | 12/2010 | Wang | ................. | H04L 47/6215 370/230.1 |
| 8,549,216 B2* | 10/2013 | Julien | ................ | G06F 13/1684 711/104 |
| 9,032,077 B1* | 5/2015 | Klein | ..................... | H04L 29/08 370/395.21 |

* cited by examiner

*Primary Examiner* — Hassan Kizou
*Assistant Examiner* — Robert A Shand
(74) *Attorney, Agent, or Firm* — Lerner, David, Littenberg, Krumholz & Mentlik, LLP

(57) ABSTRACT

To handle different Quality of Service (QoS) requirements, there may be a need for supporting multiple parallel data paths to exchange data between two or more peer entities of a data communication system. Each data path between the peer entities may be characterized by various QoS parameters such as priority, delay, jitter, data rate, etc. A communication system may allocate transmission resources for each data path based on the QoS parameters associated with them. Since the allocated transmission resources may not be always sufficient to send all the pending data from an application, the data packets may be segmented or packed depending on the available transmission resources. In such a case, doing segmentation may lead to inefficient usage of the transmission resources. A method and apparatus are disclosed that avoid such segmentation and allocates the transmission resources to the other active data paths which can better utilize the transmission resources.

20 Claims, 11 Drawing Sheets

Transmission Side　　　　　Reception Side

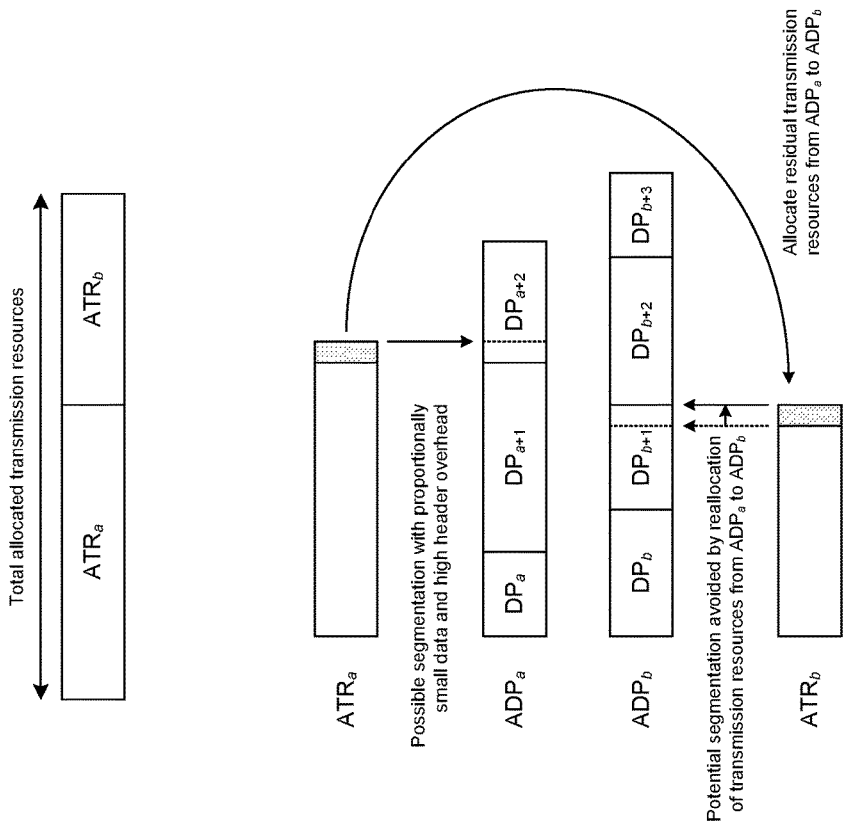

METHOD AND APPARATUS FOR EFFICIENT USAGE OF TRANSMISSION RESOURCES IN WIRELESS COMMUNICATION SYSTEMS

BACKGROUND

In data communication systems, to handle different Quality of Service (QoS) requirements, there may be a need for supporting multiple parallel data paths to exchange data between two or more peer entities, e.g., a client and a server in a client-server model of interactions between two entities. Each data path between the peer entities may be characterized by various QoS parameters such as priority, delay, jitter, data rate, etc. Depending on the QoS parameters for each data path, the buffer (storage) requirement in a communication system may be determined to manage the inflow of data packets from the application and to maintain the data packets until the packets are sent to the peer entity on the receiving side.

Given the QoS parameters that include but are not limited to priority, delay, jitter and data rate for each data path, each data path may lead to certain buffer (storage) requirements. To handle the peak data rate for each data path and to maintain the QoS, the data communication system may be capable of allocating maximum possible transmission resources for each data path based on the QoS parameters associated with that data path. The transmission resources may be the uplink radio frequency channel bandwidth in the case of wireless communication systems. In a data communication system, the entity which transmits the data is referred as "transmitting entity" and the entity which receives the data is referred as "receiving entity."

The services and features of data communication systems may be implemented in distinct layers. The data packets given by the application or upper layer of any protocol is referred as Service Data Unit (SDU). The data packet processing on the transmission side may add headers or footers or both to an SDU and the data unit provided to the lower layer is referred to as Protocol Data Unit (PDU) as shown in FIG. 1. On the transmission side a protocol entity accepts an SDU from the upper layer as the input and performs data packet processing. On the receiving side, a protocol entity accepts a PDU as the input from the lower layer and performs data packet processing. The data packet processing on the reception side may remove headers or footers or both from the PDU and provide an SDU to the upper layer.

Typically in a data communication system, in a transmitting entity, since the allocated transmission resources may not be always sufficient to send all the pending data from an application, the data packets may be segmented or packed depending on the available transmission resources. The "transmission units" herein referred as TU that are formed from the pending data of an active data path as shown in FIG. 2 based on the allocated transmission resources. A PDU may contain multiple TUs from different active data paths.

Based on the QoS parameters, there may be multiple active data paths and the allocated transmission resources may be distributed across all the active data paths based on their QoS parameters. When a data packet in a data path is segmented or packed, there may be additional overhead such as data packet header or data packet segment header while forming the transmission unit as shown in FIG. 2. Every segment may lead to an additional overhead of header (HDR) in the TU.

A communication system may allocate transmission resources for each data path based on the QoS parameters associated with them. Since the allocated transmission resources may not be always sufficient to send all the pending data from an application, the data packets may be segmented or packed depending on the available transmission resources. In such a case, doing segmentation may lead to inefficient usage of the transmission resources.

Let B denote the number of bytes of header information that is required to add a segment in a transmission unit. Based on the allocated TU for a data path, there may be scenarios where the remaining transmission resources that can be used for segmenting the last data packet could be either exactly B bytes or B+M bytes where M<B. In such a case, doing segmentation leads to inefficient usage of the transmission resources. There is a tradeoff between whether to segment a data packet and incur the overhead for the segmentation headers or allocate the transmission resources to the other active data paths which may better utilize the transmission resources.

SUMMARY

A method and apparatus are disclosed that may avoid such segmentation and may allocate the transmission resources to the other active data paths which may better utilize the transmission resources.

In accordance with an aspect of the present disclosure, a method may allocate a transmission resource in a wireless communication system. The method may include controlling, by a processing device, when a new data packet is received from a predetermined layer of a communication protocol or an application, (A) (i) storing an Individual Data Packet Size (IDPS) for the new data packet in a storage element of a Data Path Information Queue (DPIQ) indicated by a Next Storage Index to Receive (NSIR), in which the DPIQ is for an Active Data Path (ADP) and has N storage elements for storing IDPSs of respective data packets received for the ADP, and in which each of the storage elements is for storing a Cumulative Data Packet Size (CDPS) equal to a sum of IPDSs respectively for data packets for the ADP received thus far, (ii) setting the Cumulative Data Packet Size (CDPS) of the storage element indicated by the NSIR equal to when a previous NSIR does not exist, the IPDS in the storage element of the DPIQ indicated by the NSIR, and when the previous NSIR exists, a sum of the CDPS in the storage element of the DPIQ indicated by the previous NSIR and the IPDS in the storage element of the DPIQ indicated by the NSIR, (iii) setting the NSIR to a next free index of the DPIQ, after the storing of the IPDS for the new data packet and the setting of the CDPS are performed; (B) when a sum of a Total Consumed Data Packet Size (TCDPS) for the ADP and Allocated Transmission Resources (ATR) for the ADP≤the CDPS in the storage element of the DPIQ indicated by a Next Storage Index to Process (NSIP), setting a Last Data Packet Storage Index (LDPSI) for the DPIQ equal to the NSIP, in which the TCDPS is equal to a total amount of data consumed thus far in a previous transmission or transmission for the ADP, and in which the LDP is a data packet of the ADP which is determined to be for transmission, and when a sum of the TCDPS and the ATR is equal to the CDPS in the storage element of the DPIQ indicated by the NSIP, setting the NSIP equal to an index of a next storage element in the DPIQ; (C) when a sum of the TCDPS and the ATR>the CDPS in the storage element of the DPIQ indicated by the NSIP, and (i) when the NSIP>the NSIR, searching the CDPS in storage elements of the DPIQ indicated by an index or indices between the NSIP and an index N, to determine the LDPSI, and when the LDPSI is not determined by searching between the NSIP and the index N in the DPIQ, searching the CDPS in storage elements of the DPIQ indicated by an index or indices between a lowest index of the DPIQ and the NSIP, to determine the LDPSI, (ii) when the NSIP<the NSIR, searching the CDPS in storage elements of the DPIQ indicated by an index or indices between the NSIP and the NSIR, to determine the LDPSI, and (iii) when a sum of the TCDPS and the ATR≤the CDPS stored in the DPIQ indicated by any storage index (SIm) of the DPIQ, setting the NSIP and the LDPSI to indicate the storage element of the DPIQ indicated by the SIm, setting a size of a first data packet or segment for transmission equal to: the CDPS in the DPIQ indicated by the NSIP (CDPSNIP)−TCDPS, setting a size of a Last Data Packet or Segment for transmission (LDPSsize) equal to: CDPSLDPSI−(the TCPDS+the ATR), in which the CDPSLDPSI is the CDPS in the storage element of the DPQI indicated by the LDPSI, and (a) when the LDPSsize≤a predetermined Segment Threshold (ST) and another ADP exists, transferring an amount of data of the ATR having a size of the LDPSsize to the another ADP and setting the TCPDS equal to the TCPDS+ATR−LDPS$_{size}$, (b) when (aa) the LDPSsize>the STa or (bb) the LDPSsize≤the ST and the another ADP does not exist, setting the TCPDS equal to a sum of the TCPDS+the ATR, and (c) when the TCPDS is equal to the CDPS in the storage element of the DPIQ indicated by the NSIP, incrementing the NSIP to a next free index of the DPIQ.

In one alternative, the predetermined layer may be above a second predetermined layer of the protocol.

In one alternative, N may be set according to Quality of Service parameters and the wireless communication system requirements.

In one alternative, the NSIP and the NSIR may be used to access the DPIQ as a circular buffer, by incrementing the NSIP and the NSIR modulo N.

In one alternative, the ATR for the ADP may be set according to Quality of Service parameters.

In one alternative, upon initialization of the DPIQ, the NSIP and the NSIR may be set to a start of the DPIQ, and the TCDPS may be set to zero.

In one alternative, when the NSIP and the NSIR are equal, the storage elements of the DPIQ may not contain pending data to be transmitted for the ADP.

In one alternative, when the ADP becomes active, the NSIP and the NSIR may set to zero.

In one alternative, when the NSIP and the NSIR are determined to be equal, the NSIP and the NSIR may be set equal to zero.

In accordance with an aspect of the present disclosure, an apparatus may allocate a transmission resource in a wireless communication system. The apparatus may include circuitry configured to control, when a new data packet is received from a predetermined layer of a communication protocol or an application, (A) (i) storing an Individual Data Packet Size (IDPS) for the new data packet in a storage element of a Data Path Information Queue (DPIQ) indicated by a Next Storage Index to Receive (NSIR), in which the DPIQ is for an Active Data Path (ADP) and has N storage elements for storing IDPSs of respective data packets received for the ADP, and in which each of the storage elements is for storing a Cumulative Data Packet Size (CDPS) equal to a sum of IPDSs respectively for data packets for the ADP received thus far, (ii) setting the Cumulative Data Packet Size (CDPS) of the storage element indicated by the NSIR equal to when a previous NSIR does not exist, the IPDS in the storage element of the DPIQ indicated by the NSIR, and when the previous NSIR exists, a sum of the CDPS in the storage element of the DPIQ indicated by the previous NSIR and the IPDS in the storage element of the DPIQ indicated by the NSIR, (iii) setting the NSIR to a next free index of the DPIQ, after the storing of the IPDS for the new data packet and the setting of the CDPS are performed; (B) when a sum of a Total Consumed Data Packet Size (TCDPS) for the ADP and Allocated Transmission Resources (ATR) for the ADP≤the CDPS in the storage element of the DPIQ indicated by a Next Storage Index to Process (NSIP), setting a Last Data Packet Storage Index (LDPSI) for the DPIQ equal to the NSIP, in which the TCDPS is equal to a total amount of data consumed thus far in a previous transmission or transmission for the ADP, and in which the LDP is a data packet of the ADP which is determined to be for transmission, and when a sum of the TCDPS and the ATR is equal to the CDPS in the storage element of the DPIQ indicated by the NSIP, setting the NSIP equal to an index of a next storage element in the DPIQ; (C) when a sum of the TCDPS and the ATR>the CDPS in the storage element of the DPIQ indicated by the NSIP, and (i) when the NSIP>the NSIR, searching the CDPS in storage elements of the DPIQ indicated by an index or indices between the NSIP and an index N, to determine the LDPSI, and when the LDPSI is not determined by searching between the NSIP and the index N in the DPIQ, searching the CDPS in storage elements of the DPIQ indicated by an index or indices between a lowest index of the DPIQ and the NSIP, to determine the LDPSI, (ii) when the NSIP<the NSIR, searching the CDPS in storage elements of the DPIQ indicated by an index or indices between the NSIP and the NSIR, to determine the LDPSI, and (iii) when a sum of the TCDPS and the ATR≤the CDPS stored in the DPIQ indicated by any storage index (SIm) of the DPIQ, setting the NSIP and the LDPSI to indicate the storage element of the DPIQ indicated by the SIm, setting a size of a first data packet or segment for transmission equal to: the CDPS in the DPIQ indicated by the NSIP (CDPSNIP)−TCDPS, setting a size of a Last Data Packet or Segment for transmission (LDPSsize) equal to: CDPSLDPSI−(the TCPDS+the ATR), in which the CDPSLDPSI is the CDPS in the storage element of the DPQI indicated by the LDPSI, and (a) when the LDPSsize≤a predetermined Segment Threshold (ST) and another ADP exists, transferring an amount of data of the ATR having a size of the LDPSsize to the another ADP and setting the TCPDS equal to the TCPDS+ATR−LDPS$_{size}$, (b) when (aa) the LDPSsize>the STa or (bb) the LDPSsize≤the ST and the another ADP does not exist, setting the TCPDS equal to a sum of the TCPDS+the ATR, and (c) when the TCPDS is equal to the CDPS in the storage element of the DPIQ indicated by the NSIP, incrementing the NSIP to a next free index of the DPIQ.

In one alternative of the apparatus, the predetermined layer may be above a second predetermined layer of the protocol.

In one alternative of the apparatus, N may be set according to Quality of Service parameters and the wireless communication system requirements.

In one alternative of the apparatus, the NSIP and the NSIR may be used to access the DPIQ as a circular buffer, by incrementing the NSIP and the NSIR modulo N.

In one alternative of the apparatus, the ATR for the ADP may be set according to Quality of Service parameters.

In one alternative of the apparatus, upon initialization of the DPIQ, the NSIP and the NSIR may be set to a start of the DPIQ, and the TCDPS may be set to zero.

In one alternative of the apparatus, when the NSIP and the NSIR are equal, the storage elements of the DPIQ may not contain pending data to be transmitted for the ADP.

In one alternative of the apparatus, when the ADP becomes active, the NSIP and the NSIR may be set to zero.

In one alternative of the apparatus, when the NSIP and the NSIR are determined to be equal, the NSIP and the NSIR may be set equal to zero.

In accordance with an aspect of the present disclosure, a communication device may include comprising: a receiver to receive a signal; and a processing device or allocating a transmission resource in a wireless communication system. The processing device may be configured to control, when a new data packet is received from a predetermined layer of a communication protocol or an application, (A) (i) storing an Individual Data Packet Size (IDPS) for the new data packet in a storage element of a Data Path Information Queue (DPIQ) indicated by a Next Storage Index to Receive (NSIR), in which the DPIQ is for an Active Data Path (ADP) and has N storage elements for storing IDPSs of respective data packets received for the ADP, and in which each of the storage elements is for storing a Cumulative Data Packet Size (CDPS) equal to a sum of IPDSs respectively for data packets for the ADP received thus far, (ii) setting the Cumulative Data Packet Size (CDPS) of the storage element indicated by the NSIR equal to when a previous NSIR does not exist, the IPDS in the storage element of the DPIQ indicated by the NSIR, and when the previous NSIR exists, a sum of the CDPS in the storage element of the DPIQ indicated by the previous NSIR and the IPDS in the storage element of the DPIQ indicated by the NSIR, (iii) setting the NSIR to a next free index of the DPIQ, after the storing of the IPDS for the new data packet and the setting of the CDPS are performed; (B) when a sum of a Total Consumed Data Packet Size (TCDPS) for the ADP and Allocated Transmission Resources (ATR) for the ADP≤the CDPS in the storage element of the DPIQ indicated by a Next Storage Index to Process (NSIP), setting a Last Data Packet Storage Index (LDPSI) for the DPIQ equal to the NSIP, in which the TCDPS is equal to a total amount of data consumed thus far in a previous transmission or transmission for the ADP, and in which the LDP is a data packet of the ADP which is determined to be for transmission, and when a sum of the TCDPS and the ATR is equal to the CDPS in the storage element of the DPIQ indicated by the NSIP, setting the NSIP equal to an index of a next storage element in the DPIQ; (C) when a sum of the TCDPS and the ATR>the CDPS in the storage element of the DPIQ indicated by the NSIP, and (i) when the NSIP>the NSIR, searching the CDPS in storage elements of the DPIQ indicated by an index or indices between the NSIP and an index N, to determine the LDPSI, and when the LDPSI is not determined by searching between the NSIP and the index N in the DPIQ, searching the CDPS in storage elements of the DPIQ indicated by an index or indices between a lowest index of the DPIQ and the NSIP, to determine the LDPSI, (ii) when the NSIP<the NSIR, searching the CDPS in storage elements of the DPIQ indicated by an index or indices between the NSIP and the NSIR, to determine the LDPSI, and (iii) when a sum of the TCDPS and the ATR≤the CDPS stored in the DPIQ indicated by any storage index (SIm) of the DPIQ, setting the NSIP and the LDPSI to indicate the storage element of the DPIQ indicated by the SIm, setting a size of a first data packet or segment for transmission equal to: the CDPS in the DPIQ indicated by the NSIP (CDPSNIP)−TCDPS, setting a size of a Last Data Packet or Segment for transmission (LDPSsize) equal to: CDPSLDPSI−(the TCPDS+the ATR), in which the CDPSLDPSI is the CDPS in the storage element of the DPQI indicated by the LDPSI, and (a) when the LDPSsize≤a predetermined Segment Threshold (ST) and another ADP exists, transferring an amount of data of the ATR having a size of the LDPSsize to the another ADP and setting the TCPDS equal to the TCPDS+ATR−LDPS$_{size}$, (b) when (aa) the LDPSsize>the STa or (bb) the LDPSsize≤the ST and the another ADP does not exist, setting the TCPDS equal to a sum of the TCPDS+the ATR, and (c) when the TCPDS is equal to the CDPS in the storage element of the DPIQ indicated by the NSIP, incrementing the NSIP to a next free index of the DPIQ.

In one alternative of the communication device, the NSIP and the NSIR may be used to access the DPIQ as a circular buffer, by incrementing the NSIP and the NSIR modulo N.

BRIEF DESCRIPTION OF THE DRAWINGS

FIG. 5 illustrates an example scenario where unnecessary segmentation is avoided according to the aspects of the present invention.

DETAILED DESCRIPTION

Figure 1:
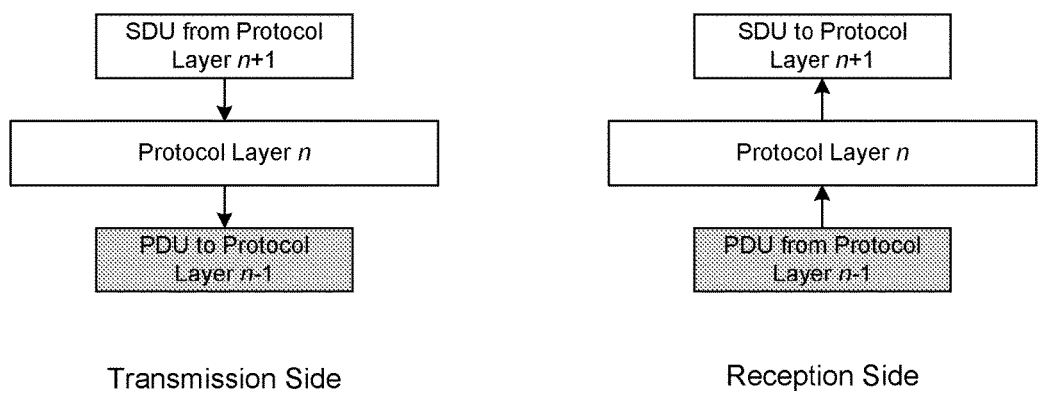
FIG. 1 illustrates a layered architecture of a data communication system.
Figure 2:
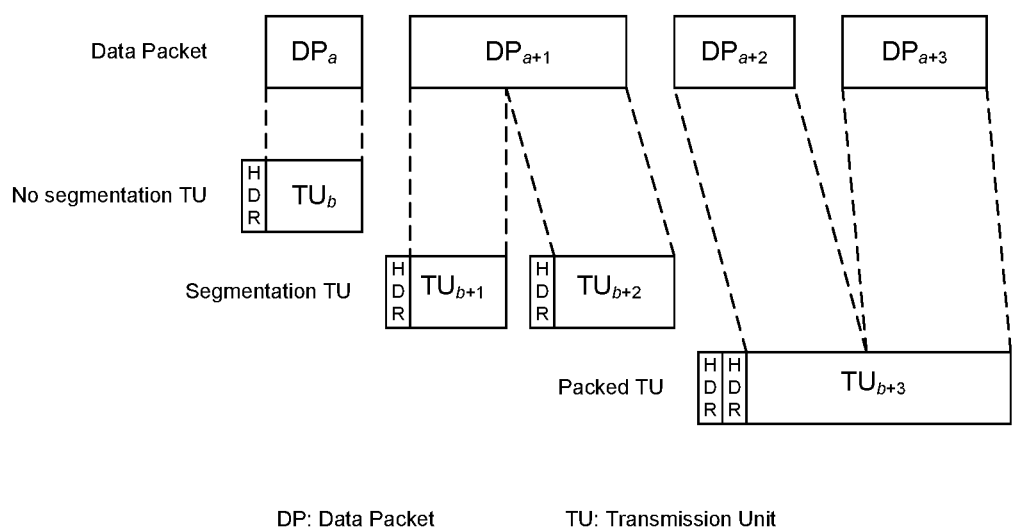
FIG. 2 illustrates a mapping of Data Packets to Transmission Units using Segmentation and Packing.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

According to an aspect of the present invention, the transmitting entity stores the information related to the individual data packet size and cumulative data packet size, and provides a mechanism to use the stored information to identify the last data packet size. This may enable the transmitting entity to determine the available remaining transmission resources to process for transmission and avoid unnecessary segmentation for efficient uplink transmission resources utilization.

Figure 3:
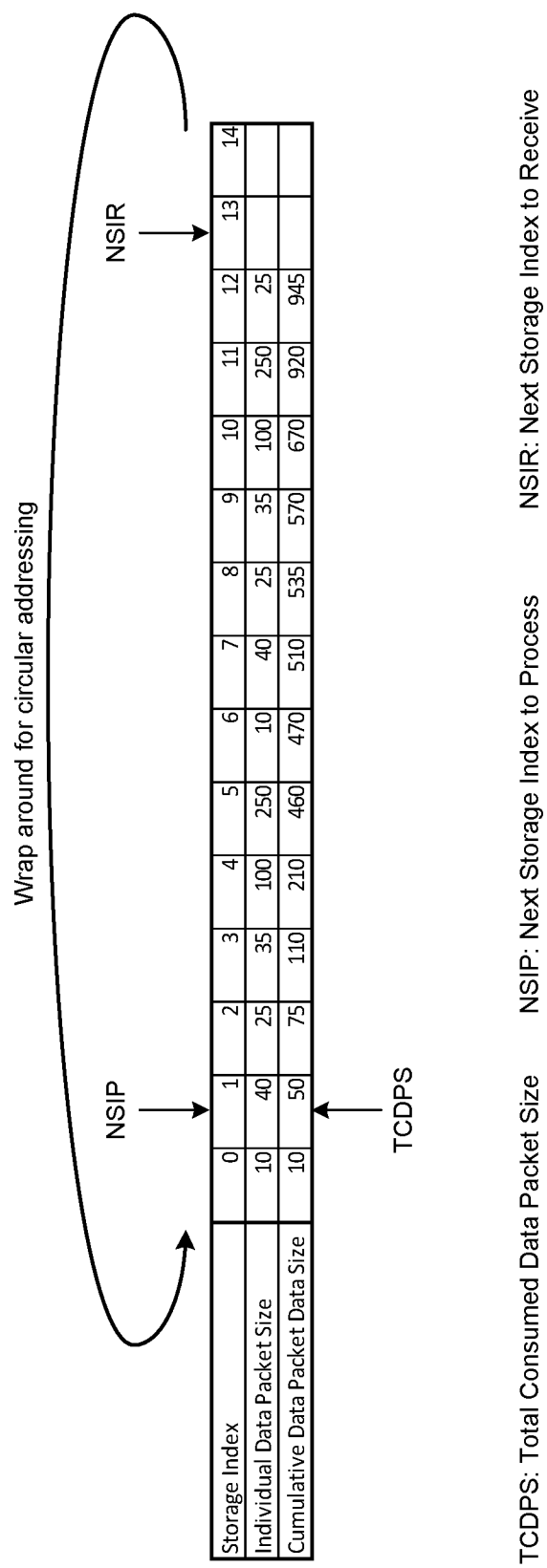
FIG. 3 illustrates a Data Path Information Queue according to the aspects of the present invention.

According to an aspect of the present invention a Data Path Information Queue (DPIQ) is maintained which stores Individual Data Packet Size (IDPS) and Cumulative Data Packet Size (CDPS) information as shown in FIG. 3. In the example shown in FIG. 3, fifteen storage elements are considered. Based on the QoS parameters and system requirements, the number of storage elements may be selected accordingly. Let N denote the number of storage elements in a DPIQ. Each storage element stores the IDPS (in bytes) for data packets received from the upper layers or an application and the CDPS (in bytes) that is received so far from the upper layer or from an application. For instance, in the example shown in FIG. 3, the storage index 4 stores the IDPS of 100 bytes, and in the same index the CDPS is stored as 210 bytes which is same as the sum of the IDPS from storage index 0 to storage index 4.

According to another aspect of the present invention, for each Active Data Path (ADP), the Next Storage Index to Process (NSIP) and the Next Storage Index to Receive (NSIR) are maintained to access DPIQ in a circular manner as shown in FIG. 3. NSIP is the next storage index from which the data packet size may be considered for transmission when new transmission resources become available. NSIR is the next storage index to be considered to store the new data packet size when a new data packet is received from the upper layer or from an application.

According to another aspect of the present invention, Total Consumed Data Packet Size (TCDPS) is maintained. The TCDPS is the total consumed data packet size which is always updated with total bytes consumed for the data path so far in the previous transmissions and it will always have a value in the range of CDPS stored in a location pointed to by NSIP. For example, in FIG. 3 NSIP is pointing to storage index 1 where the value of TCDPS could be 10≤TCDPS<50.

According to another aspect of the present invention, when uplink transmission resources are received to transmit the pending data, based on the QoS parameters the Allocated Transmission Resources (ATR) for each data path are identified. Next the allocated transmission resources are used to find the data packet to be considered for transmission as Last Data Packet (LDP). The storage index for LDP is referred to as LDP Storage Index (LDPSI). Based on the ATR and LDP, the method determines whether to perform segmentation of the data packets in the current data path queue or transfer the remaining allocated TU to next active data path entity.

For an ADP a ($ADP_a$), the following terminology is used:
Data Path Information Queue: $DPIQ_a$
Next Storage Index To Process: $NSIP_a$
Next Storage Index To Receive: $NSIR_a$
Number of storage elements in $DPIQ_a$: $N_a$
Allocated Transmission Resources: $ATR_a$
Cumulative Data Packet Size: $CDPS_a$
Total Consumed Data Packet Size: $TCDPS_a$
Last Data Packet: $LDP_a$
Last Data Packet Storage Index considered for transmission: $LDPSI_a$
Last Data Packet Segment Size: $LDPS_{size}$ The aspects of the present invention are illustrated in the flow diagrams contained in FIG. 4A, FIG. 4B, and FIG. 4C. The steps in the flow diagrams are aspects of the present invention which are described next.

Figure 4A:
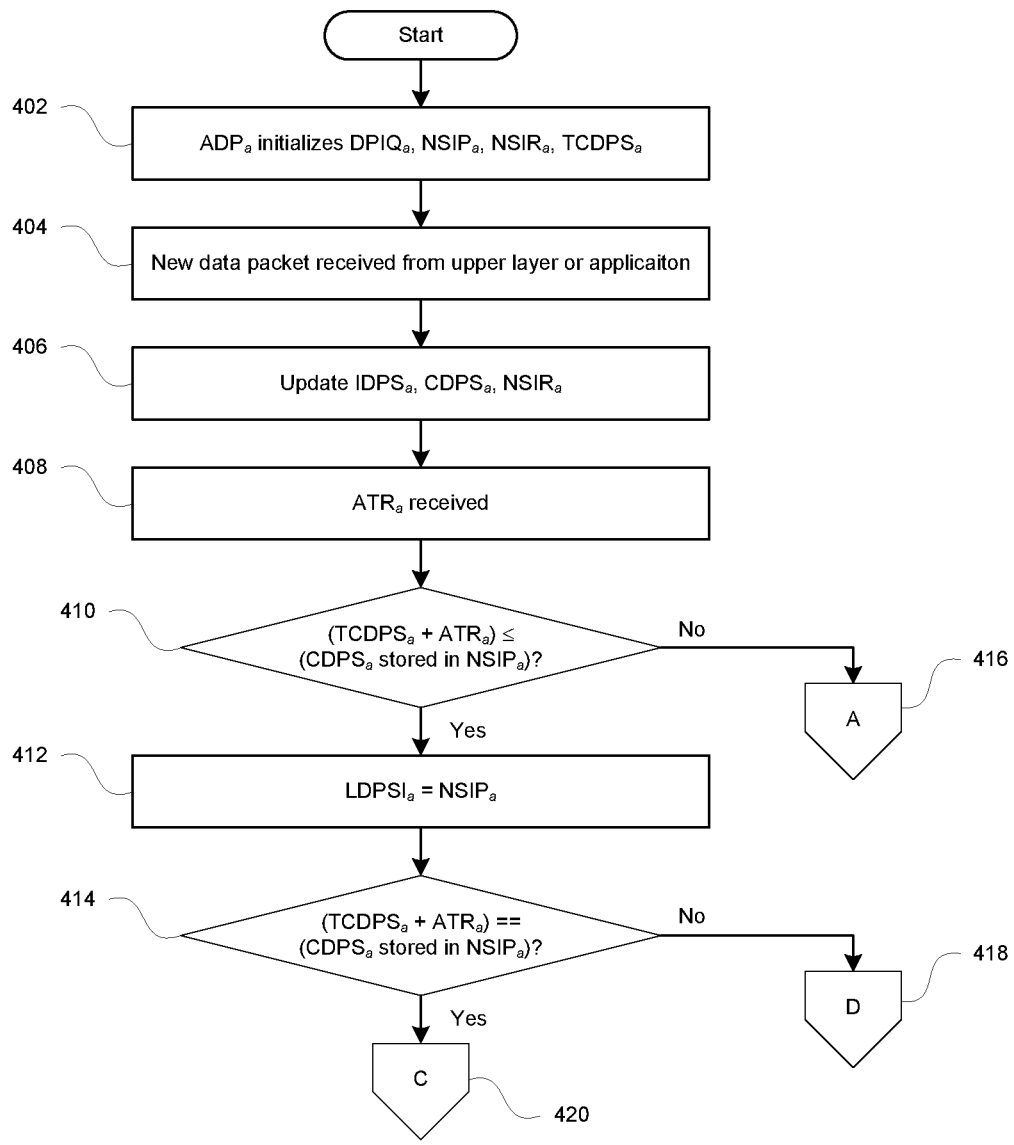
FIG. 4A illustrates the first part of an example flow diagram for processing steps according to aspects of the present invention.

In FIG. 4A, at processing stage 402, the initialization is performed for the parameters defined above. The memory for the $DPIQ_a$ is allocated and the pointers $NSIP_a$ and $NSIR_a$ are set to the start of the $DPIQ_a$. The $TCDPS_a$ is initialized to zero.

According to an aspect of the present invention, when $NSIP_a$ is equal to $NSIR_a$, there is no pending data in $DPIQ_a$ for the $ADP_a$ to be transmitted.

According to another aspect of the present invention, both $NSIP_a$ and $NSIR_a$ may be initialized to '0' when a data path $ADP_a$ becomes active. Also, whenever $NSIP_a$ is equal to $NSIR_a$, their values may be set to '0'.

According to another aspect of the present invention, the $DPIQ_a$ is maintained as a circular buffer queue wherein $NSIP_a$ and $NSIR_a$ will be incremented modulo $N_a$ to wrap around the $DPIQ_a$ and thereby maintain a circular storage for IDPS and CDPS for the data packets received from upper layers.

At processing stage 404, a new data packet is received from the upper layer or from an application. According to another aspect of the present invention, when a data packet is received from the upper layer or application, the $IDPS_a$ may be stored in the storage index $NSIR_a$ of the $DPIQ_a$. According to another aspect of the present invention, when a data packet is received from the upper layer or from an application, the $CDPS_a$ in previous index of $NSIR_a$ will be added to $IDPS_a$ of $NSIR_a$, herein referred as New CDPS ($NCDPS_a$). The $CDPS_a$ of $NSIR_a$ in $DPIQ_a$ will be updated with $NCDPS_a$ and then $NSIR_a$ will be updated to the next free index of $DPIQ_a$ as shown in processing stage 406.

According to another aspect of the present invention, a new Data Path Queue Binary Search (DPQBSRCH) method is specified which uses $NSIP_a$, $NSIR_a$, $N_a$, $ATR_a$ as input parameters and outputs $LDPSI_a$. The $LDPSI_a$ for an active data path $ADP_a$ is identified using the specified method DPQBSRCH. The details of this method are covered in the flow diagrams contained in FIG. 4A, FIG. 4B, and FIG. 4C.

According to another aspect of the present invention, the DPQBSRCH may search $DPIQ_a$ using $TCDPS_a+ATR_a$ as the input to find $LDPSI_a$. The DPQBSRCH follows different paths depending on whether segmentation is required. If segmentation is required, it follows different path depending on the size of the $ATR_a$ and the configured thresholds to determine whether to do segmentation or to reallocate the allocated TU to the next active data path.

Figure 4B:
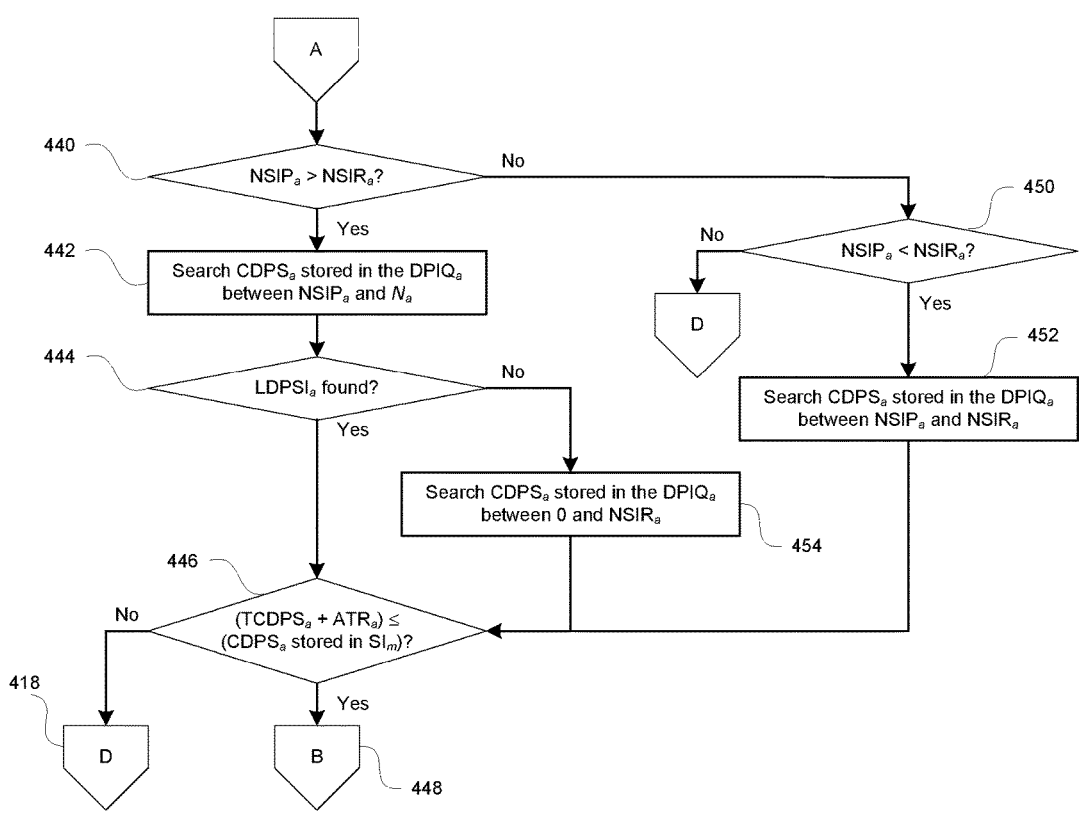
FIG. 4B illustrates the second part of an example flow diagram for processing steps according to aspects of the present invention.
Figure 4C:
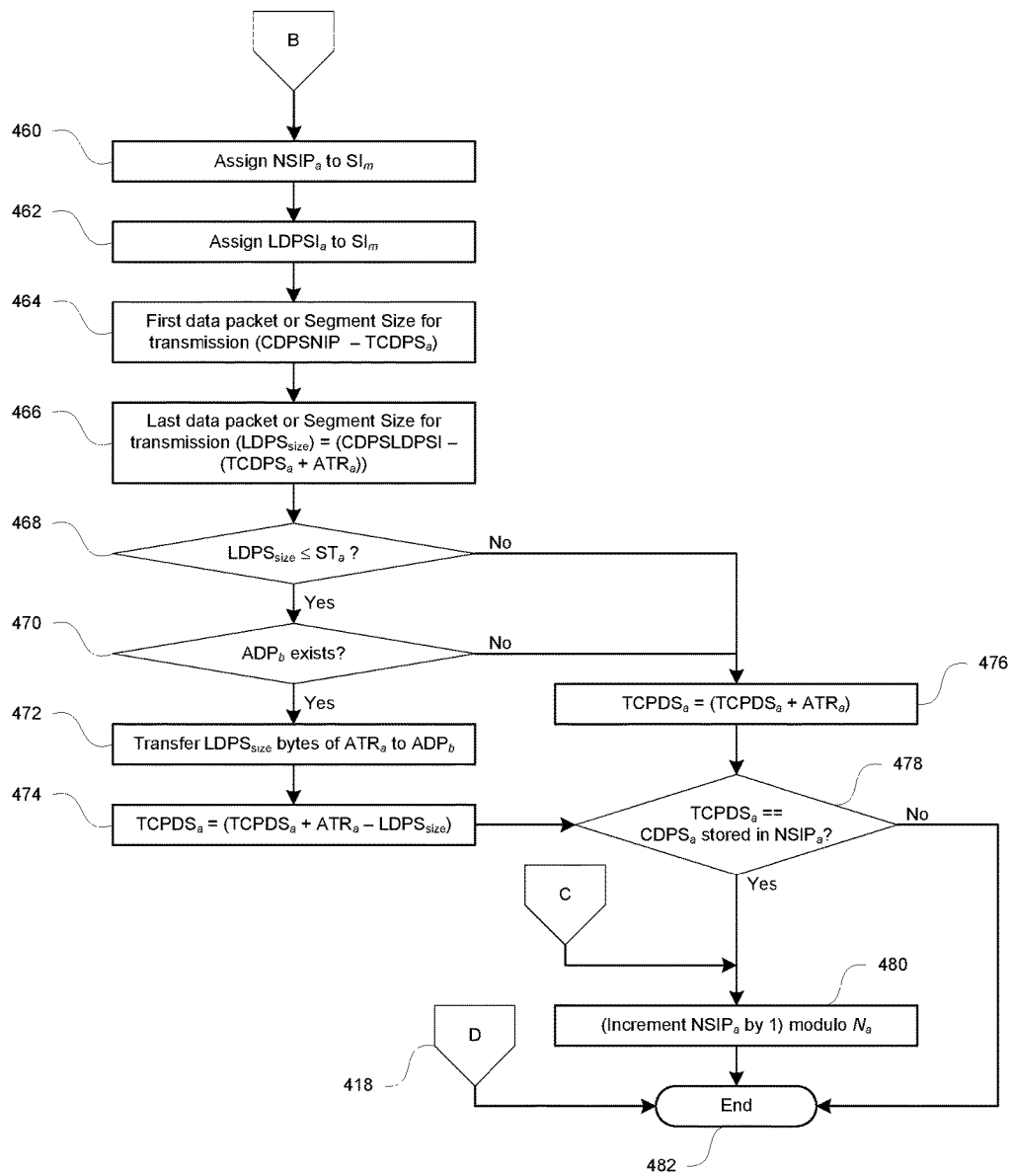
FIG. 4C illustrates the third part of an example flow diagram for processing steps according to aspects of the present invention.

According to another aspect of the invention, at processing stage 410, the DPQBSRCH may check if the condition (($TCDPS_a+ATR_a$)≤($CDPS_a$ stored in $NSIP_a$)) is true and if it is true, then it may return $NSIP_a$ as $LDPSI_a$ at processing stage 412 and if the condition (($TCDPS_a+ATR_a$)==($CDPS_a$ stored in $NSIP_a$)) is true then it may increment $NSIP_a$ modulo $N_a$ at processing stage 480 in FIG. 4C. This is the path taken when no segmentation is required.

Returning to FIG. 4A at processing stage 410, according to an aspect of the present invention, if the condition (($TCDPS_a+ATR_a$)>($CDPS_a$ stored in $NSIP_a$)) is true, segmentation may be required and the processing continues at processing stage 440 in FIG. 4B.

According to an aspect of the present invention, at processing stage 440, if the condition ($NSIP_a$>$NSIR_a$) is true then it is considered as $NSIR_a$ wrap around scenario where the DPQBSRCH may do the binary search on $CDPS_a$ between storage index $NSIP_a$ to $N_a$ at processing stage 442. At processing stage 444 it is determined whether the $LDPSI_a$ is found or not between the storage indexes $NSIP_a$ to $N_a$. If LDPSI$_a$ is not found, then the DPQBSRCH will do the binary search from storage index of 0 to NSIR$_a$ at processing stage 454. Next the processing continues at processing stage 446. If it is determined at processing stage 444 that LDPSI$_a$ is found between the storage indexes NSIP$_a$ to N$_a$, the processing goes directly to the processing stage 446.

Returning to processing stage 440, if the condition (NSIP$_a$>NSIR$_a$) is false, then the processing advances to stage 450 where it is checked if the condition (NSIP$_a$<NSIR$_a$) is true. If it is not true, it means that NSIP$_a$ and NSIR$_a$ are pointing to the same element and the queue is empty. The processing in this case suitably terminates at processing stage 482. If the condition (NSIP$_a$<NSIR$_a$) is true at processing stage 450, then at processing stage 452 DPQBSRCH will take the NSIP$_a$ and NSIR$_a$ as the start index and end index respectively to do the binary search based on the CDPS$_a$ stored in the DPIQ$_a$ between NSIP$_a$ and NSIR$_a$. After finding the LDPSI$_a$ at processing stage 452, the processing continues to processing stage 446.

At processing stage 446 in FIG. 4B, if DPQBSRCH cannot find the LDPSI$_a$, i.e., if DPQBSRCH finds that if the condition (TCPDS$_a$+ATR$_a$)>(CDPS$_a$ stored in any SI$_m$) is true, then the processing jumps to the off-page reference 418 and from there it suitably terminates at processing stage 482.

Let an arbitrary storage index m in the DPIQ$_a$ be denoted by SI$_m$. According to another aspect of the invention, at processing stage 446 in FIG. 4B, if DPQBSRCH finds the condition (TCPDS$_a$+ATR$_a$)<=(CDPS$_a$ stored in any SI$_m$) is true, then the processing continues off-page reference 448 which is present in FIG. 4C. According to the aspect of the present invention, at processing stages 460 and 462, the DPQBSRCH may assign NSIP$_a$ and LDPSI$_a$ to SI$_m$ respectively and may output NSIP$_a$ as the LDPSIa.

According to an aspect of the present invention, at processing stage 464, the transmission entity may find the first data packet size or segment of data packet size to be considered for transmission as (CDPSNIP−TCDPS$_a$), where CDPSNIP is the CDPS$_a$ stored in NSIP$_a$.

According to another aspect of the present invention, at processing stage 466, once LDPSI$_a$ is identified and new NSIP$_a$ is identified, the transmission entity may find the LDPS$_{size}$ as follows:

$$LDPS_{size} = (CDPSLDPSI - (TCPDS_a + ATR_a)) \quad (1)$$

where CDPSLDPSI is the CDPS$_a$ stored in LDPSI$_a$ and identified by DPQBSRCH.

According to an aspect of the present invention a Segment Threshold (ST) is defined and the value of the threshold may be derived based on the particular data communication system, different active data paths with different QoS parameters, and the transmission unit header format and size. For example, the ST may be six bytes.

According to another aspect of the present invention, denote the ST for a given active data path by ST$_a$ (in bytes). At processing stage 468, a determination is made whether (LDPS$_{size}$≤ST$_a$) is true. If the condition is true, the processing continues to processing stage 470. At processing stage 470, it is determined whether there exists another active data path ADP$_b$. If ADP$_b$ exists, then at processing stage 472, the transmitting entity may provide LDPS$_{size}$ bytes of ATR$_a$ to the next available active data path where the inefficient segmentation in ADP$_a$ may be avoided and the transmission resources may be utilized in ADP$_b$ more efficiently. At processing stage 474, according to another aspect of the present invention, TCPDS$_a$ may be incremented with ATR$_a$ as follows:

$$TCPDS_a = TCPDS_a + ATR_a - LDPS_{size} \quad (2)$$

The processing then continues at processing stage 478.

According to another aspect of invention if the condition (LDPS$_{size}$>ST$_a$) is true, then processing continues to processing stage 476. At processing stage 476, the TCPDS$_a$ may be incremented with ATR$_a$ as follows:

$$TCPDS_a = TCPDS_a + ATR_a \quad (3)$$

According to another aspect of invention at processing stage 468, if the condition (LDPS$_{size}$≤ST$_a$) is true, and another active data path does not exist at processing stage 470, then the processing continues to processing block 476, where the ATR$_a$ may be fully utilized for ADP$_a$ and TCPDS$_a$ will be incremented in the same manner described in EQ. (3).

Regardless of whether the path is taken from processing stage 474 or 476, the processing continues to processing stage 478. According to another aspect of the present invention, at processing stage 478, if the condition (TCPDS$_a$==CDPS$_a$ stored in NSIP$_a$) is true, then NSIP$_a$ may be incremented by 1 at processing stage 480. The processing then terminates at processing stage 482. If condition at processing stage 478 is false, then the processing suitably terminates at processing block 482.

With the present invention, as illustrated in FIG. 5, the uplink transmission resources may be efficiently used by avoiding any unnecessary segmentation of data packets and thereby reducing the unwanted data packet header overhead in the transmitting entity and increased transmission resource utilization while maintaining the QoS required for the data transmission of multiple parallel data paths.

Figure 6:
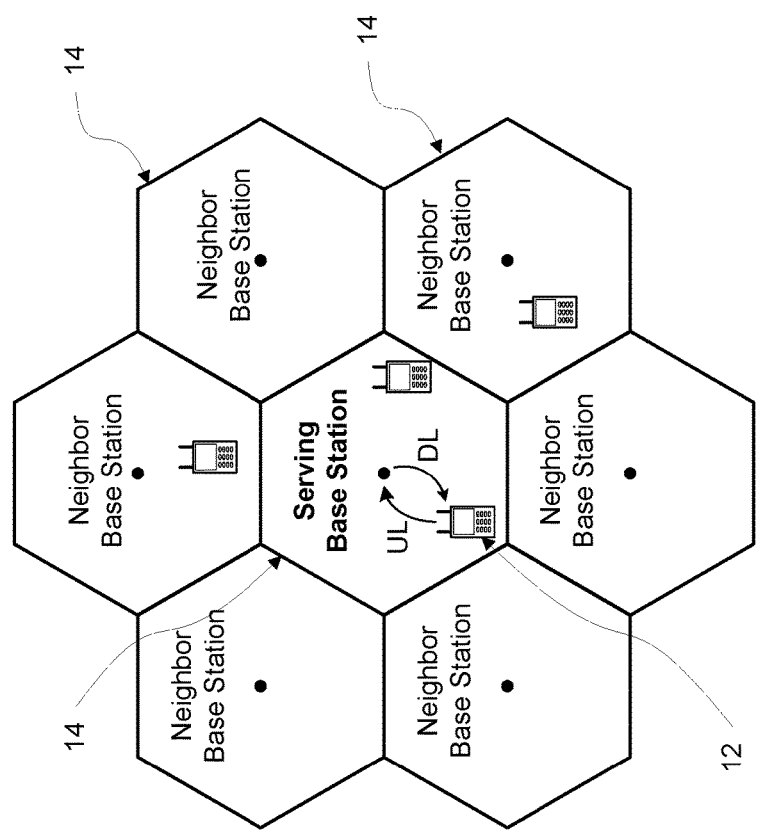
FIG. 6 illustrates a conventional mobile wireless communication system.

Typically, as shown in FIG. 6, a wireless communication system, which is a type of data communication system, comprises elements such as client terminals or mobile stations and one or more base stations. Other network devices may also be employed, such as a mobile switching center (not shown). As illustrated in FIG. 6, the communication path from the base station ("BS") to the client terminal or mobile station ("MS") is referred to herein as a downlink ("DL") direction or downlink channel, and the communication path from the client terminal to the base station is referred to herein as an uplink ("UL") direction or uplink channel. In some wireless communication systems, the MS communicates with the BS in both the DL and UL directions. For instance, such communication is carried out in cellular telephone systems. In other wireless communication systems, the client terminal communicates with the base stations in only one direction, usually the DL. Such DL communication may occur in applications such as paging. As used herein, the terms "base station" and "network" are used interchangeably.

By way of example only, the above-described method may be implemented in a receiver, e.g., a user device such as a wireless mobile station (MS) 12 as shown in FIG. 6.

Figure 7:
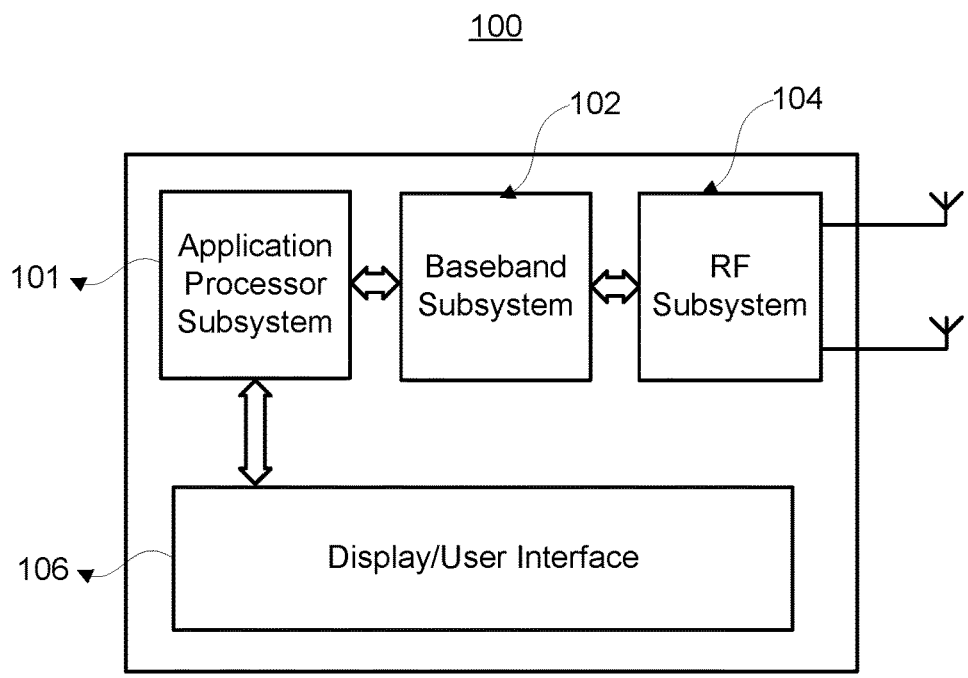
FIG. 7 illustrates a wireless mobile station diagram, which may be employed with aspects of the invention described herein.

As shown in FIG. 7, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 8:
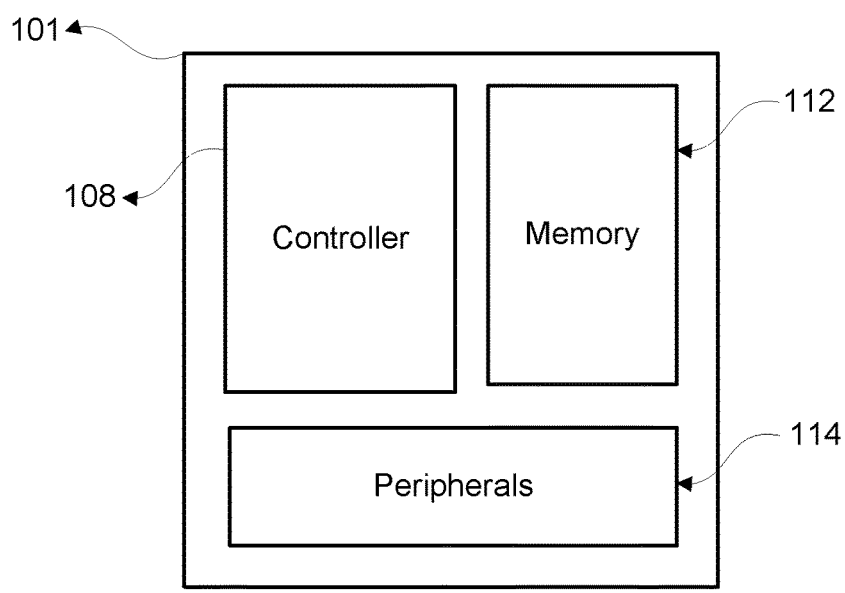
FIG. 8 illustrates an application processor subsystem for a wireless mobile station, which may be employed with aspects of the invention described herein.
Figure 9:
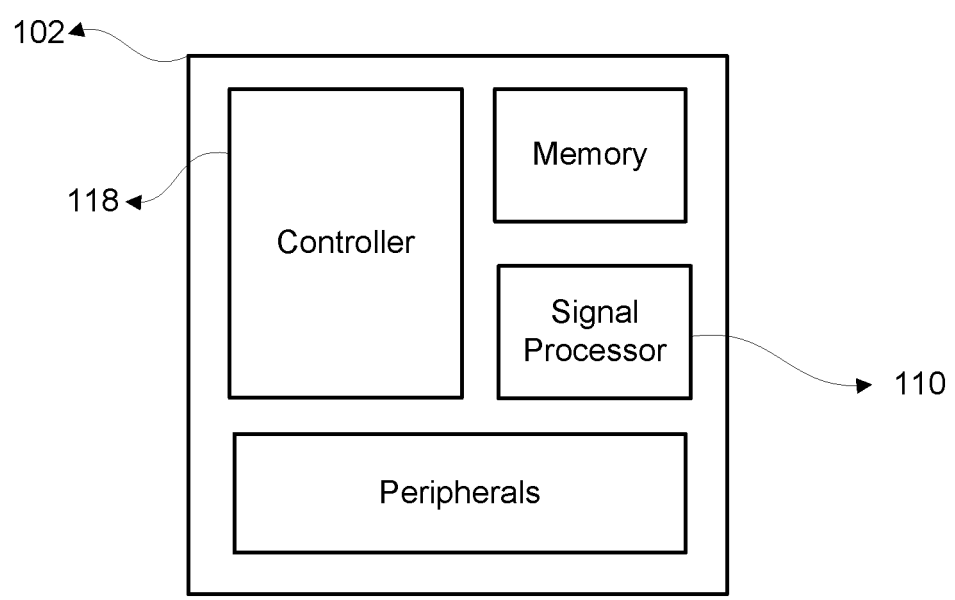
FIG. 9 illustrates a baseband subsystem for a wireless mobile station, which may be employed with aspects of the invention described herein.
Figure 10:
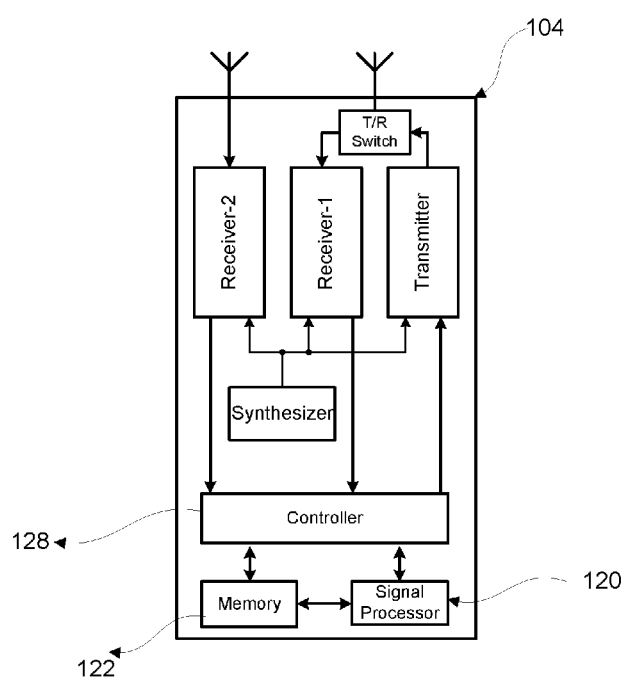
FIG. 10 illustrates an RF subsystem for a wireless mobile station, which may be employed with aspects of the invention described herein.

The application processor subsystem 101 as shown in FIG. 8 may include a controller 108 such as a microcontroller, another processor or other circuitry. The baseband subsystem 102 as shown in FIG. 9 may include a controller 118 such as a microcontroller or other processor. The RF subsystem 104 as shown in FIG. 10 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present invention.

Peripherals 114 such as a full or partial keyboard, video or still image display, audio interface, etc may be employed and managed through the controller 108.

Aspects of the present invention may be implemented in firmware of the controller 108 of the application processor and/or the controller 118 of the baseband subsystem. In another alternative, aspects of the present invention may also be implemented as a combination of firmware and hardware of the application processor subsystem 101 and/or the baseband subsystem 102. For instance, a signal processing entity of any or all of the FIG. 9 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the invention may include smartphones, tablets, laptops, gaming consoles, cameras, video camcorders, TV, car entertainment systems, etc.

For client terminals used in stationary or limited mobility applications, the number of cell reselections and handovers may be limited due to lack of mobility. The present invention enables client terminals in such applications to avoid having to update the broadcast or multicast system information for long periods of time. Often such client terminals are battery operated without the ability to recharge the batteries such as in the case of Machine-2-Machine (M2M) or Internet of Things (IoT) devices. The present invention may enable significant reduction in power consumption and may extend the life of the M2M/IoT client terminals.

Aspects of the present invention may be applied to all types of mobile communications systems and the like, such as systems based on 3rd Generation Partnership Project (3GPP) Long Term Evolution (LTE) of wireless communication standard, systems based on 3GPP Wideband Code Division Multiple Access ("WCDMA") standard, systems based on an IEEE 802.16 wireless communication standard, etc.

Although aspects of the invention herein have been described with reference to particular embodiments, it is to be understood that these embodiments are merely illustrative of the principles and applications of the aspects of the present invention. It is therefore to be understood that numerous modifications may be made to the illustrative embodiments and that other arrangements may be devised without departing from the spirit and scope of the aspects of the present invention as defined by the appended claims. Aspects of each embodiment may be employed in the other embodiments described herein.

The invention claimed is:

1. A method for allocating a transmission resource for transmission of a given data packet on a given data path at a communication device in a wireless communication system, the method comprising:

controlling, by a processing device, when a new data packet for transmission by the communication device over a communication network of the wireless communication system is received at the communication device from a predetermined layer of a communication protocol of or an application at the communication device, (A) (i) storing an Individual Data Packet Size (IDPS) for the new data packet in a storage element of a Data Path Information Queue (DPIQ) indicated by a Next Storage Index to Receive (NSIR), in which the NSIR indicates a next storage index in the DPIQ to store a new data packet size when a given new data packet is received from the predetermined layer or the application, and in which the storage element is stored in a memory of the communication device, in which the DPIQ is for an Active Data Path (ADP) and has N storage elements for storing IDPSs of respective data packets received for the ADP, and in which each of the storage elements is for storing a Cumulative Data Packet Size (CDPS) equal to a sum of IPDSs respectively for data packets for the ADP received thus far, (ii) setting the Cumulative Data Packet Size (CDPS) of the storage element indicated by the NSIR equal to when a previous NSIR does not exist, the IPDS in the storage element of the DPIQ indicated by the NSIR, and when the previous NSIR exists, a sum of the CDPS in the storage element of the DPIQ indicated by the previous NSIR and the IPDS in the storage element of the DPIQ indicated by the NSIR, and (iii) setting the NSIR to a next free index of the DPIQ, after the storing of the IPDS for the new data packet and the setting of the CDPS are performed;

(B) when a sum of a Total Consumed Data Packet Size (TCDPS) for the ADP and Allocated Transmission Resources (ATR) for the ADP≤the CDPS in the storage element of the DPIQ indicated by a Next Storage Index to Process (NSIP), in which the NSIP indicates a next storage index in the DPIQ from which to evaluate data packet size for transmission when a new transmission resource becomes available, (i) setting a Last Data Packet Storage Index (LDPSI) for the DPIQ equal to the NSIP, in which the TCDPS is equal to a total amount of data consumed thus far in a previous transmission or transmission for the ADP, and in which the LDP is a data packet of the ADP which is determined to be for transmission, and (ii) when a sum of the TCDPS and the ATR is equal to the CDPS in the storage element of the DPIQ indicated by the NSIP, setting the NSIP equal to an index of a next storage element in the DPIQ;

(C) when a sum of the TCDPS and the ATR>the CDPS in the storage element of the DPIQ indicated by the NSIP, and (i) when the NSIP>the NSIR, searching the CDPS in storage elements of the DPIQ indicated by an index or indices between the NSIP and an index N, to determine the LDPSI, and when the LDPSI is not determined by searching between the NSIP and the index N in the DPIQ, searching the CDPS in storage elements of the DPIQ indicated by an index or indices between a lowest index of the DPIQ and the NSIP, to determine the LDPSI, (ii) when the NSIP<the NSIR, searching the CDPS in storage elements of the DPIQ indicated by an index or indices between the NSIP and the NSIR, to determine the LDPSI, and (iii) when a sum of the TCDPS and the ATR≤the CDPS stored in the DPIQ indicated by any storage index (SIm) of the DPIQ, setting the NSIP and the LDPSI to indicate the storage element of the DPIQ indicated by the SIm, setting a size of a first data packet or segment for transmission equal to: the CDPS in the DPIQ indicated by the NSIP (CDPSNIP)−TCDPS, setting a size of a Last Data Packet or Segment for transmission (LDPSsize) equal to: CDPSLDPSI−(the TCPDS+the ATR), in which the CDPSLDPSI is the CDPS in the storage element of the DPQI indicated by the LDPSI, and when the LDPSsize≤a predetermined Segment Threshold (ST) and another ADP exists, transferring an amount of data of the ATR having a size of the LDPSsize to the another ADP and setting the TCPDS equal to the TCPDS+ATR−$LDPS_{size}$, when (a) the LDPSsize>the ST or (b) the LDPSsize≤the ST and the another ADP does not exist, setting the TCPDS equal to a sum of the TCPDS+the ATR, and when the TCPDS is equal to the CDPS in the storage element of the DPIQ indicated by the NSIP, incrementing the NSIP to a next free index of the DPIQ.

2. The method of claim 1, wherein the predetermined layer is above a second predetermined layer of the protocol.

3. The method of claim 1, wherein N is set according to Quality of Service parameters and the wireless communication system requirements.

4. The method of claim 1, wherein the NSIP and the NSIR are used to access the DPIQ as a circular buffer, by incrementing the NSIP and the NSIR modulo N.

5. The method of claim 1, wherein the ATR for the ADP is set according to Quality of Service parameters.

6. The method of claim 1, wherein upon initialization of the DPIQ, the NSIP and the NSIR are set to a start of the DPIQ, and the TCPDS is set to zero.

7. The method of claim 1, wherein, when the NSIP and the NSIR are equal, the storage elements of the DPIQ do not contain pending data to be transmitted for the ADP.

8. The method of claim 1, wherein, when the ADP becomes active, the NSIP and the NSIR are set to zero.

9. The method of claim 1, wherein, when the NSIP and the NSIR are determined to be equal, the NSIP and the NSIR are set equal to zero.

10. An apparatus for allocating a transmission resource for transmission of a given data packet on a given data path at a communication device in a wireless communication system, the apparatus comprising:

circuitry configured to control, when a new data packet for transmission by the communication device over a communication network of the wireless communication system is received at the communication device from a predetermined layer of a communication protocol of or an application at the communication device, (A) (i) storing an Individual Data Packet Size (IDPS) for the new data packet in a storage element of a Data Path Information Queue (DPIQ) indicated by a Next Storage Index to Receive (NSIR), in which the NSIR indicates a next storage index in the DPIQ to store a new data packet size when a given new data packet is received from the predetermined layer or the application, and in which the storage element is stored in a memory of the communication device, in which the DPIQ is for an Active Data Path (ADP) and has N storage elements for storing IDPSs of respective data packets received for the ADP, and in which each of the storage elements is for storing a Cumulative Data Packet Size (CDPS) equal to a sum of IPDSs respectively for data packets for the ADP received thus far, (ii) setting the Cumulative Data Packet Size (CDPS) of the storage element indicated by the NSIR equal to when a previous NSIR does not exist, the IPDS in the storage element of the DPIQ indicated by the NSIR, and when the previous NSIR exists, a sum of the CDPS in the storage element of the DPIQ indicated by the previous NSIR and the IPDS in the storage element of the DPIQ indicated by the NSIR, and (iii) setting the NSIR to a next free index of the DPIQ, after the storing of the IPDS for the new data packet and the setting of the CDPS are performed;

(B) when a sum of a Total Consumed Data Packet Size (TCDPS) for the ADP and Allocated Transmission Resources (ATR) for the ADP≤the CDPS in the storage element of the DPIQ indicated by a Next Storage Index to Process (NSIP), in which the NSIP indicates a next storage index in the DPIQ from which to evaluate data packet size for transmission when a new transmission resource becomes available, (i) setting a Last Data Packet Storage Index (LDPSI) for the DPIQ equal to the NSIP, in which the TCDPS is equal to a total amount of data consumed thus far in a previous transmission or transmission for the ADP, and in which the LDP is a data packet of the ADP which is determined to be for transmission, and (ii) when a sum of the TCDPS and the ATR is equal to the CDPS in the storage element of the DPIQ indicated by the NSIP, setting the NSIP equal to an index of a next storage element in the DPIQ;

(C) when a sum of the TCDPS and the ATR>the CDPS in the storage element of the DPIQ indicated by the NSIP, and (i) when the NSIP>the NSIR, searching the CDPS in storage elements of the DPIQ indicated by an index or indices between the NSIP and an index N, to determine the LDPSI, and when the LDPSI is not determined by searching between the NSIP and the index N in the DPIQ, searching the CDPS in storage elements of the DPIQ indicated by an index or indices between a lowest index of the DPIQ and the NSIP, to determine the LDPSI, (ii) when the NSIP<the NSIR, searching the CDPS in storage elements of the DPIQ indicated by an index or indices between the NSIP and the NSIR, to determine the LDPSI, and (iii) when a sum of the TCDPS and the ATR≤the CDPS stored in the DPIQ indicated by any storage index (SIm) of the DPIQ, setting the NSIP and the LDPSI to indicate the storage element of the DPIQ indicated by the SIm, setting a size of a first data packet or segment for transmission equal to: the CDPS in the DPIQ indicated by the NSIP (CDPSNIP)−TCDPS, setting a size of a Last Data Packet or Segment for transmission (LDPSsize) equal to: CDPSLDPSI−(the TCPDS+the ATR), in which the CDPSLDPSI is the CDPS in the storage element of the DPQI indicated by the LDPSI, and when the LDPSsize≤a predetermined Segment Threshold (ST) and another ADP exists, transferring an amount of data of the ATR having a size of the LDPSsize to the another ADP and setting the TCPDS equal to the TCPDS+ATR−LDPS$_{size}$, when (a) the LDPSsize>the ST or (b) the LDPSsize≤the ST and the another ADP does not exist, setting the TCPDS equal to a sum of the TCPDS+the ATR, and when the TCPDS is equal to the CDPS in the storage element of the DPIQ indicated by the NSIP, incrementing the NSIP to a next free index of the DPIQ.

11. The apparatus of claim 10, wherein the predetermined layer is above a second predetermined layer of the protocol.

12. The apparatus of claim 10, wherein N is set according to Quality of Service parameters and the wireless communication system requirements.

13. The apparatus of claim 10, wherein the NSIP and the NSIR are used to access the DPIQ as a circular buffer, by incrementing the NSIP and the NSIR modulo N.

14. The apparatus of claim 10, wherein the ATR for the ADP is set according to Quality of Service parameters.

15. The apparatus of claim 10, wherein upon initialization of the DPIQ, the NSIP and the NSIR are set to a start of the DPIQ, and the TCPDS is set to zero.

16. The apparatus of claim 10, wherein, when the NSIP and the NSIR are equal, the storage elements of the DPIQ do not contain pending data to be transmitted for the ADP.

17. The apparatus of claim 10, wherein, when the ADP becomes active, the NSIP and the NSIR are set to zero.

18. The apparatus of claim 10, wherein, when the NSIP and the NSIR are determined to be equal, the NSIP and the NSIR are set equal to zero.

19. A communication device comprising:
a receiver to receive a signal; and
a processing device for allocating a transmission resource for transmission of a given data packet on a given data path at the communication device in a wireless communication system,
wherein the processing device is configured to control, when a new data packet for transmission by the communication device over a communication network of the wireless communication system is received at the communication device from a predetermined layer of a communication protocol of or an application at the communication device, (A) (i) storing an Individual Data Packet Size (IDPS) for the new data packet in a storage element of a Data Path Information Queue (DPIQ) indicated by a Next Storage Index to Receive (NSIR), in which the NSIR indicates a next storage index in the DPIQ to store a new data packet size when a given new data packet is received from the predetermined layer or the application, and in which the storage element is stored in a memory of the communication device, in which the DPIQ is for an Active Data Path (ADP) and has N storage elements for storing IDPSs of respective data packets received for the ADP, and in which each of the storage elements is for storing a Cumulative Data Packet Size (CDPS) equal to a sum of IPDSs respectively for data packets for the ADP received thus far, (ii) setting the Cumulative Data Packet Size (CDPS) of the storage element indicated by the NSIR equal to when a previous NSIR does not exist, the IPDS in the storage element of the DPIQ indicated by the NSIR, and when the previous NSIR exists, a sum of the CDPS in the storage element of the DPIQ indicated by the previous NSIR and the IPDS in the storage element of the DPIQ indicated by the NSIR, and (iii) setting the NSIR to a next free index of the DPIQ, after the storing of the IPDS for the new data packet and the setting of the CDPS are performed;

(B) when a sum of a Total Consumed Data Packet Size (TCDPS) for the ADP and Allocated Transmission Resources (ATR) for the ADP≤the CDPS in the storage element of the DPIQ indicated by a Next Storage Index to Process (NSIP), in which the NSIP indicates a next storage index in the DPIQ from which to evaluate data packet size for transmission when a new transmission resource becomes available, (i) setting a Last Data Packet Storage Index (LDPSI) for the DPIQ equal to the NSIP, in which the TCDPS is equal to a total amount of data consumed thus far in a previous transmission or transmission for the ADP, and in which the LDP is a data packet of the ADP which is determined to be for transmission, and (ii) when a sum of the TCDPS and the ATR is equal to the CDPS in the storage element of the DPIQ indicated by the NSIP, setting the NSIP equal to an index of a next storage element in the DPIQ;

(C) when a sum of the TCDPS and the ATR>the CDPS in the storage element of the DPIQ indicated by the NSIP, and (i) when the NSIP>the NSIR, searching the CDPS in storage elements of the DPIQ indicated by an index or indices between the NSIP and an index N, to determine the LDPSI, and when the LDPSI is not determined by searching between the NSIP and the index N in the DPIQ, searching the CDPS in storage elements of the DPIQ indicated by an index or indices between a lowest index of the DPIQ and the NSIP, to determine the LDPSI, (ii) when the NSIP<the NSIR, searching the CDPS in storage elements of the DPIQ indicated by an index or indices between the NSIP and the NSIR, to determine the LDPSI, and (iii) when a sum of the TCDPS and the ATR≤the CDPS stored in the DPIQ indicated by any storage index (SIm) of the DPIQ, setting the NSIP and the LDPSI to indicate the storage element of the DPIQ indicated by the SIm, setting a size of a first data packet or segment for transmission equal to: the CDPS in the DPIQ indicated by the NSIP (CDPSNIP)−TCDPS, setting a size of a Last Data Packet or Segment for transmission (LDPSsize) equal to: CDPSLDPSI−(the TCPDS+the ATR), in which the CDPSLDPSI is the CDPS in the storage element of the DPQI indicated by the LDPSI, and when the LDPSsize≤a predetermined Segment Threshold (ST) and another ADP exists, transferring an amount of data of the ATR having a size of the LDPSsize to the another ADP and setting the TCPDS equal to the TCPDS+ATR−LDPS$_{size}$, when (a) the LDPSsize>the ST or (b) the LDPSsize≤the ST and the another ADP does not exist, setting the TCPDS equal to a sum of the TCPDS+the ATR, and when the TCPDS is equal to the CDPS in the storage element of the DPIQ indicated by the NSIP, incrementing the NSIP to a next free index of the DPIQ.

20. The communication device of claim 19, wherein the NSIP and the NSIR are used to access the DPIQ as a circular buffer, by incrementing the NSIP and the NSIR modulo N.

* * * * *